United States Patent [19]

Grade et al.

[11] 4,423,639

[45] Jan. 3, 1984

[54] APPARATUS FOR ADJUSTING AND INDICATING THE TENSION IN A GUY LINE

[75] Inventors: Lanny V. Grade, Oklahoma City; Stuart E. Corry, Hallett, both of Okla.

[73] Assignee: The Geolograph Company, Oklahoma City, Okla.

[21] Appl. No.: 324,101

[22] Filed: Nov. 23, 1981

[51] Int. Cl.³ .............................................. G01L 5/04
[52] U.S. Cl. .............................. 73/862.42; 73/862.58; 254/257
[58] Field of Search ............ 73/862.42, 862.58, 862.39, 73/862.56; 254/257, 252, 231, 256

[56] References Cited

U.S. PATENT DOCUMENTS

| 2,328,364 | 8/1943 | Taylor | 73/862.42 |
|---|---|---|---|
| 2,376,037 | 5/1945 | Davies et al. | 73/862.42 |
| 2,550,440 | 12/1947 | Atkisson | 254/257 |
| 2,640,353 | 6/1953 | Hefner | 73/862.58 X |
| 3,382,713 | 5/1968 | Chutter | 73/151 |

FOREIGN PATENT DOCUMENTS 2055481  3/1981  United Kingdom ............ 73/862.42

*Primary Examiner*—S. Clement Swisher
*Assistant Examiner*—Brian Tumm
*Attorney, Agent, or Firm*—William S. Dorman

[57] ABSTRACT

A tension indicator used on a guy line system of an inclined oilwell derrick, comprising a hydraulic compression load cell, a pair of interlocking U-shaped yokes housing the load cell between the bases of the U-shaped portions, a plunger connected to the load cell bearing against the base of one interlocking yoke, the load cell bearing against the base of the other interlocking yoke, a walking load binder mounted on the outer end of a first interlocking yoke and providing an initial tension load to the guy line system, a threaded nut and screw adjustment assembly affixed to the outer end of a second interlocking yoke and providing a finer adjustment of the tension provided by the walking load binder, a pair of attachment hooks rotatably mounted on the outer ends of the tension indicator device for inserting the tension indicator device between a set of intermediate chains connected in a guy line, and a calibrated pressure gauge directly attached to the load cell; whereby the interlocking yokes transfer a linear tension load in the guy line into a compressive in the load cell; by and wherein the compressive force is transmitted as a pressure signal to the pressure gauge.

4 Claims, 4 Drawing Figures

APPARATUS FOR ADJUSTING AND INDICATING THE TENSION IN A GUY LINE

BACKGROUND OF THE INVENTION

1. Field of the Invention

The present invention relates to an apparatus for measuring and adjusting the tension in a guy line used to stabilize oil well derricks. More particularly, the present invention relates to a device used on the inclined derricks of oilwell servicing and workover rigs.

2. Prior Art

Vehicle-mounted unitized oilwell servicing and workover rigs are used on inclined or tilted derricks to provide floor space for the crew to work freely. These rigs, which are conventionally telescoping, are mounted on the back of a truck and are inclined at approximately a 3° tilt during operation. The inclined derricks require guy lines to maintain or control the tilt of the derrick under operating design loads.

There are two types of guy lines which are generally used on inclined servicing derricks. The first type comprises the internal guy lines attached to the derrick crown and connected to the front of the truck on which the derrick is mounted thus providing structural stability to the rig. The second type comprises. A set of four external guy lines which are attached to the derrick crown and are spread out on a ground pattern of about 30 to 45 degrees from the centerline of the rig. These external guy lines are attached to dead men anchors in the ground and are generally used to resist wind loads. Two of the four external guy lines run in the same direction as the internal guy lines to help provide derrick stability.

The oilwell servicing rigs using inclined derricks may experience serious load shifts under the influence of heavy hoisting loads or wind loads. In order to restrain derrick movement and minimize load shifts, the manufacturers of the servicing rigs specify pre-tensioning guy lines to a specific load. In the past, the pre-tensioning of the guy lines has usually been accomplished by a catenary or sag method, which is inexact and difficult to conduct with any consistency or accuracy. Currently, there is no means to provide a servicing crew with an accurate indication of the true tension or to provide the ability to adjust to the desired tension.

A prior art patent, U.S. Pat. No. 3,382,713 to Chutter, discloses a system which computes and records the work of a wireline which is used in a block and tackle system. The electrically operated device determines the load on the wireline and gives the product in ton miles. The result of the product, determined by the Chutter system, is useful to determine when to move and/or cut a wireline used on drilling rigs to raise or lower drill pipe.

A tension measuring device for use with guy lines of a vertical mast or tower, such as a radio antenna tower, is disclosed in U.S. Pat. No. 2,376,037 to Davies et al. The device comprises two yokes which are detachably fastened to the guy lines at separate points. The guy line system which uses the Davies invention employs turnbuckles and links. Another device used for placing the guy lines of a vertical radio tower under the proper predetermined tension is disclosed in U.S. Pat. No. 2,328,364 to Taylor.

No prior art device of the type disclosed herein is used for any type of tensioning, especially on any type of an inclined serving derrick of an oilwell rig.

SUMMARY OF THE INVENTION

The device of the present invention provides a means for measuring and adjusting the tension in guy lines used to stabilize inclined derricks of oil well servicing rigs. The present invention provides a servicing crew with an accurate indication of the actual operating tension, and provides the crew with the ability to adjust the guy lines to a desired pre-tension. The present invention is designed with a maximum load capacity of 10,000 pounds of pull. Although the primary use of the apparatus is with guy lines on an inclined derrick, it can be employed in many situations where an indication and/or an adjustment of tension is required.

The device of the present invention comprises a hydraulic compression load cell to which is attached an indicating pressure gauge, and a walking load binder. A walking load binder or boomer is installed in a guy line with lengths of chain between the guy line and the ground anchor or the attachment on the vehicle. The walking load binder allows for tensioning of the chain by taking up one or more links at a time.

The compression load cell is installed within two interlocking U-shaped yokes between a walking load binder assembly and an adjustment assembly. Each end of the tension indicator device of the present invention is provided with a rotatable hook which is inserted through the links of chain on a guy line. Initial tension can be applied to the guy line by taking up links of chain on the walking load binder. A finer adjustment can be obtained by means of a threaded nut and screw assembly.

The interlocking yokes transfer the tension load on the guy line into a compression load on the load cell. When tension is applied to the guy line, a pressure is generated in the hydraulic load cell by the piston. The pressure gauge, which is calibrated in units of tension or pull, is connected directly to the load cell through a hole in one of the yokes. The above generated pressure is transmitted to the gauge and an accurate tension reading is displayed.

DETAILED DESCRIPTION OF THE PREFERRED EMBODIMENTS

Figure 1:
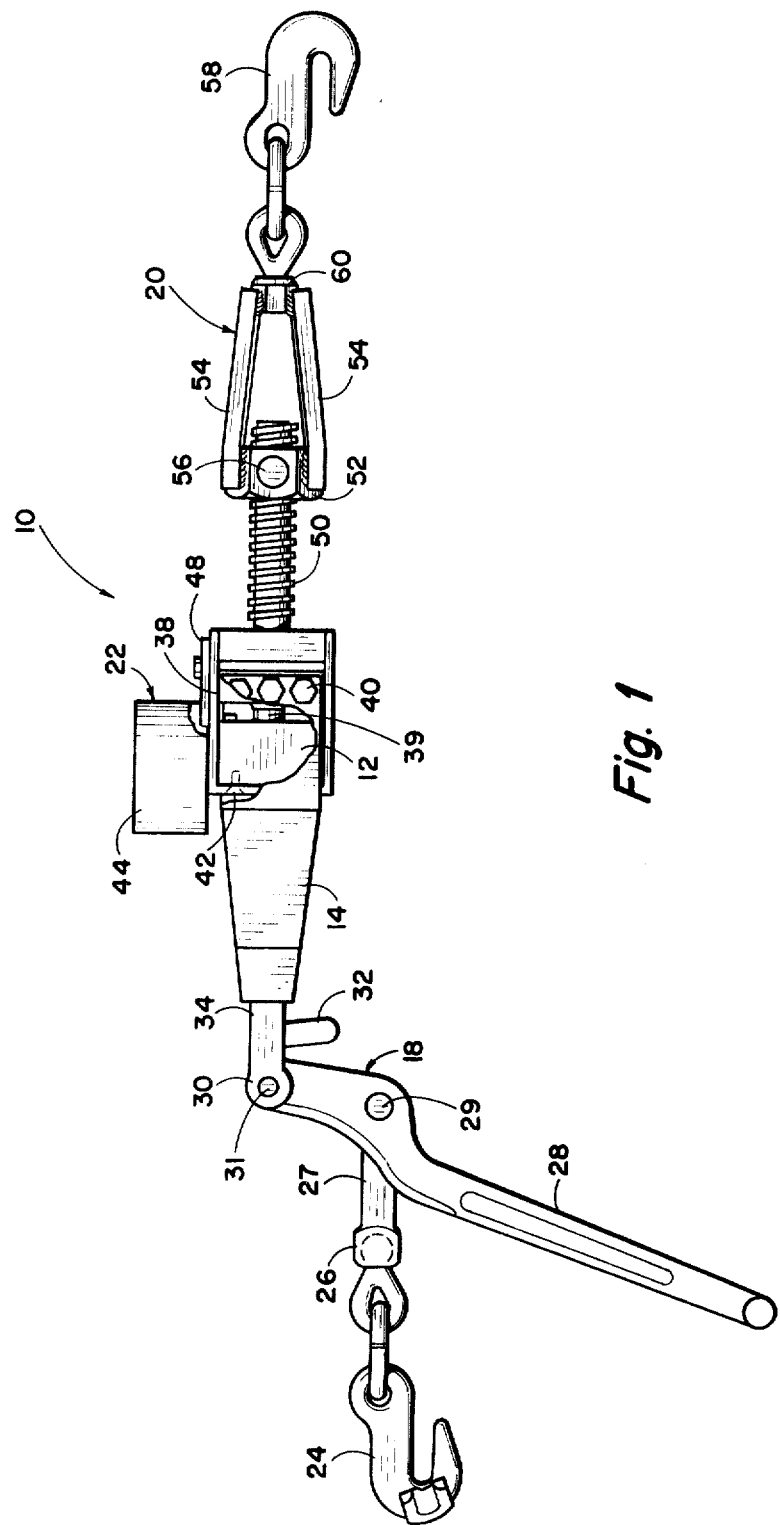
FIG. 1 is an elevational view of the tension adjuster and indicator device of the present invention.
Figure 2:
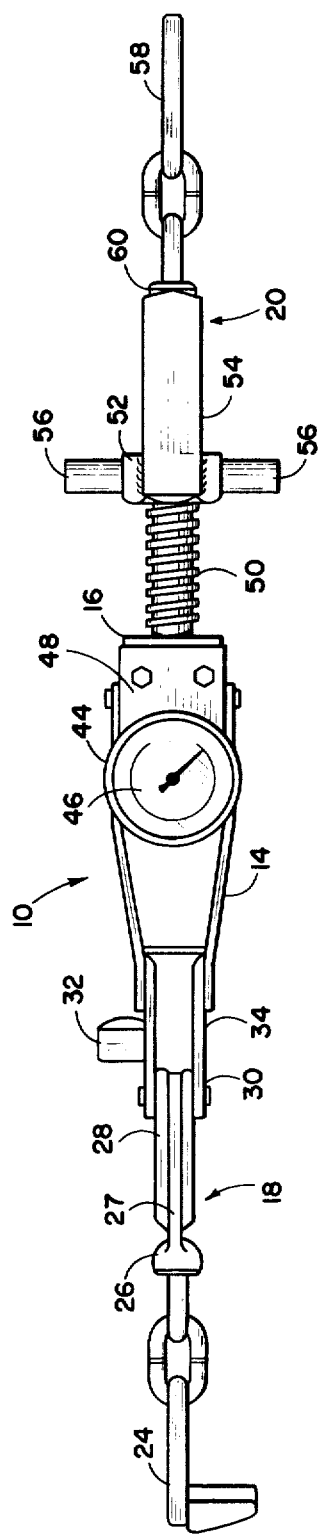
FIG. 2 is a top plan view of the device of the present invention.

Referring to FIGS. 1 and 2 of the drawings in detail, the present invention comprises a guy line tension adjuster and indicator 10. The tension indicator 10 provides a means of measuring and adjusting the tension in guy lines used to stabilize the inclined derricks of oil well servicing rigs.

Tension indicator 10 comprises a hydraulic compression load cell 12 which is housed within two interlocking U-shaped yokes 14 and 16, to be disclosed in further detail hereinafter. The interlocking yokes 14 and 16 provide a means to transfer a tension load or pull of the guy lines into a compressive load on load cell 12. One interlocking yoke or load binder yoke 14 is attached at its outer end to a walking load binder assembly 18. Walking load binders or boomers, whose purpose will be disclosed hereinafter, are a well known art in the oilfield industry. The remaining interlocking yoke or load cell mounting yoke 16 is attached at its outer end to an adjustment assembly 20, to be disclosed in greater detail hereinafter. The tension indicator 10 also includes a pressure gauge 22 which is connected hydraulically to the compression load cell 12, and which will be disclosed in greater detail hereinafter.

The walking load binder assembly 18 comprises an attachment or load binder hook 24 which is rotatably mounted on a portion of the outer end of binder assembly 18 by means of a ball and socket joint 26. The end of a binder link 27 opposite of the ball and socket joint 26 is pivotally connected to a load binder arm 28 by means of a pivot pin 29. The load binder arm or lever 28 is pivotally connected at its upper end to a toggle assembly or mechanism 30 by means of toggle pin 31. The toggle assembly includes an auxiliary or holding hook 32, whose purpose will be disclosed hereinafter. The holding hook 32 is affixed to a toggle assembly link 34 which is subsequently connected to load binder yoke 14. The walking load binder assembly provides an initial tensioning means for a guy line in a manner to be disclosed hereinafter.

Figure 3:
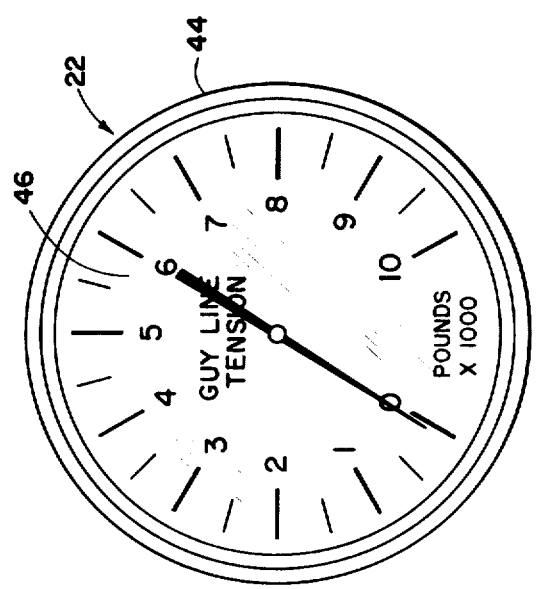
FIG. 3 is an enlarged top plan view of the gauge of the present invention.

The load cell mounting yoke 16 contains the load cell 12. A piston or plunger 39 is connected to the load cell to impart a force thereto and a plunger block 38 is connected to the other end of the piston. The plunger block 38 is held in position against the base of the "U" of the load binder yoke 14 by means of bolts 40 which pass through the sides of the yoke 14 and into the plunger block. The load cell 12 is held in position against the mounting yoke 16 by means of screws 42. The pressure gauge 22 is directly and hydraulically connected to the load cell 12 by means of a fitting (not shown) which passes through a hole (not shown) in the mounting yoke so that the internal working portions of the gauge (not shown) are at the pressure of the load cell. As shown in FIG. 3, the pressure gauge is calibrated in units of tension, wherein 10,000 lbs. of tension is the maximum load capacity of the tension indicator 10. The gauge 22 is housed within a gauge case 44, and is provided with gauge lens 46. The pressure gauge is connected to a base plate 48 which is bolted to the mounting yoke 16.

The adjustment assembly 20 provides a means to fine-adjust the amount of tension in a guy line which is coarsely adjusted by the walking load binder. Adjustment assembly 20 comprises an adjustment screw 50 which is affixed at one end to a portion of the load cell mounting yoke 16, and whose other end is threadedly received in a threaded nut 52. The threaded nut is affixed to an adjustment yoke 54, and is provided with a turning handle 56. The turning handle 56 aids in the finer adjustment of guy line tension which is accomplished by lengthening or shortening the entire adjustment assembly 20 by turning nut 52 over the adjustment screw 50. The adjustment assembly is also provided with an attachment hook 58 which is rotatably mounted on the end of adjustment yoke 54 by means of a swivel assembly 60.

Figure 4:
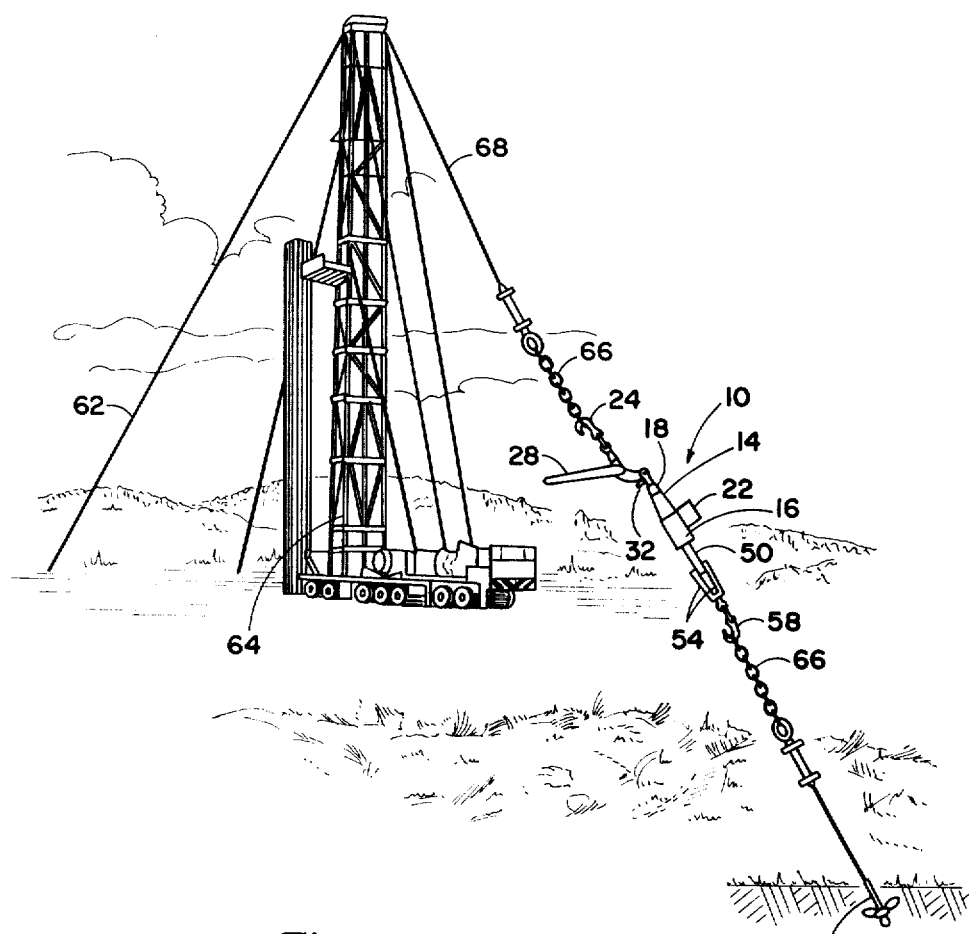
FIG. 4 is an perspective view of an inclined derrick of an oilwell servicing rig showing the present invention in use on a guy line system.

Referring to FIG. 4, the tension indicator is inserted into a portion of a guy line system 62 of a vehicle-mounted inclined derrick 64. As shown, the indicator is located between two lengths of chain 66, which are included in guy line system 62. The attached hooks 24 and 58 are inserted through the links of chains, 66 between a guy line 68 and a ground anchor 70.

The walking load binder assembly 18 allows for the initial tensioning of the chain and the attached guy line by taking up one or more links at a time. The most common usage for walking load binders is for holding loads such as pipe on a truck bed. The walking load binder incorporates a toggle mechanism 30 with the arm 28 which acts as a handle, and with the two hooks 24 and 58 which are attached to the links of chain 66. In order to take up more links, the toggle mechanism is actuated by pivoting the arm toward the device 10 and thus tensioning the chain. A link of chain, that is in a slack position (not shown), can be inserted onto the holding hook 32 thus freeing the outer hook 24 (when the arm 28 is pivoted away from the device) to take up another bite of chain.

As previously described, a finer adjustment of tension can be obtained by means of threaded nut 52 and adjustment screw 50. When tension is applied to the guy line through the walking load assembly and the fine adjustment assembly, the yokes 14 and 16 will tend to pull apart and a pressure is generated in the load cell 12 by the piston 39 both of which are compressed between the bases of the U's of the interlocking portions of the yokes. The above generated pressure or pull is transmitted to the gauge 22 and an accurate tension reading is displayed.

Whereas the present invention has been described in particular relation to the drawings attached hereto, it should be understood that other and further modifications, apart from those shown or suggested herein, may be made within the spirit and scope of this invention.

What is claimed is:

1. A tension indicator device used in conjunction with a guy line system of an inclined oilwell derrick, comprising a hydraulic compression load cell, a pair of interlocking U-shaped yokes housing said load cell, each yoke having an outer end and an inner base portion, a pressure generating plunger connected to said load cell and positioned against the base portion of the U of one interlocking yoke of said pair of interlocking yokes while said load cell is positioned against the base portion of the U of the other of said interlocking yokes of said pair of interlocking yokes, whereby, when a tension force is applied to the ends of said yokes, a compression force will be applied to said load cell and said plunger through said base portions of said yokes, an initial tensioning means mounted on one of said outer ends and providing an initial tension load to said guy line system, a fine adjustment means affixed to the other of said outer ends and providing a finer adjustment of the tension provided by said initial tensioning means, a plurality of attachment means rotatably mounted on the ends of said tension indicator device providing a means to insert said tension indicator device between a set of intermediate chains of said guy line system, and a calibrated pressure gauge directly attached to said load cell; and whereby said interlocking yokes transfer a linear tension load into a compression force in said load cell by means of said plunger and wherein said compression force is transmitted as a pressure signal to said pressure gauge.

2. A tension indicator device as set forth in claim 1 wherein said initial tensioning means comprises a walking load binder attached to said first interlocking yoke by a toggle joint assembly having a catching hook thereon; whereby said initial tension is provided by said walking load binder taking up connected links of a chain in said guy line system.

3. A tension indicator device as set forth in claim 1 wherein said fine adjustment means comprises an adjustment assembly including an adjustment screw having one end affixed to said second interlocking yoke and having the other end threadedly received in a nut wherein said nut is affixed to an adjustment yoke and whereby an adjustment of the tension provided by said initial tensioning means is made by rotating said nut about said adjustment screw thereby lengthening or shortening said adjustment assembly.

4. A tension indicator device as set forth in claim 1 wherein said plurality of attachment means comprises a first attachment hook rotatably mounted on an outer portion of said initial tensioning means and a second attachment hook rotatably mounted on the outer end of said fine adjustment means.

* * * * *